(12) United States Patent
Tulczyjew et al.

(10) Patent No.: US 12,432,128 B2
(45) Date of Patent: Sep. 30, 2025

(54) EFFICIENT GENERATION OF SPECIALIZED LARGE LANGUAGE MODELS FOR NETWORK TRAFFIC ANALYSIS

(71) Applicant: B.yond, Inc., Redmond, WA (US)

(72) Inventors: Łukasz Tulczyjew, Gliwice (PL); Nathanael Weill, Cote Saint Luc (CA); Charles Abondo, Nuns Island (CA); Albert Khoury Aouad, Ottawa (CA)

(73) Assignee: B.yond, Inc., Redmond, WA (US)

( * ) Notice: Subject to any disclaimer, the term of this patent is extended or adjusted under 35 U.S.C. 154(b) by 56 days.

(21) Appl. No.: 18/524,850

(22) Filed: Nov. 30, 2023

(65) Prior Publication Data
US 2025/0184247 A1 Jun. 5, 2025

(51) Int. Cl.
*H04L 43/067* (2022.01)
*H04L 41/16* (2022.01)

(52) U.S. Cl.
CPC ............ *H04L 43/067* (2013.01); *H04L 41/16* (2013.01)

(58) Field of Classification Search
CPC . H04L 63/1425; H04L 41/16; H04L 63/1416; H04L 63/1433; H04L 63/1441; H04L 43/04; H04L 41/145; H04L 63/145; H04L 63/20; H04L 41/147; H04L 43/0852; H04L 63/1408; H04L 41/5009; H04L 43/026; H04L 43/028; H04L 43/045; H04L 63/0227; H04L 41/0894; H04L 43/0888; H04L 65/80; H04L 41/083; H04L 41/142; H04L 43/062; H04L 43/065; H04L 63/14; H04L 63/1466; H04L 41/0631; H04L 41/5032; H04L 43/06; H04L 43/50; H04L 47/2475; H04L 63/0245; H04L 63/10; H04L 63/1458; H04L 63/1483; H04L 67/306; H04L 67/535; H04L 41/40; H04L 43/0876; H04L 43/12; H04L 61/4511; H04L 63/0861; H04L 63/108; H04L 41/069; H04L 41/22; H04L 9/40;
(Continued)

(56) References Cited

U.S. PATENT DOCUMENTS

2016/0359887 A1* 12/2016 Yadav ................ H04L 63/1425
2017/0339022 A1 11/2017 Hegde et al.
(Continued)

OTHER PUBLICATIONS

Haixuan Guo et al., "LogBERT: Log Anomaly Detection via BERT," 2021 international joint conference on neural networks (IJCNN), IEEE, 2021.
(Continued)

*Primary Examiner* — Djenane M Bayard
(74) *Attorney, Agent, or Firm* — WTA IP Law P.C.

(57) ABSTRACT

Embodiments relate to generating specialized large language models by performing transfer learning on a base large language model. The base large language model is trained using network traffic capture files as training data to predict information in a network traffic capture file during inference. The base large language model is modified into specialized large language models for including in different applications for performing communication network analysis. In this way, the specialized large language models may be developed in an expedient and efficient manner by leveraging the training performed on the base large language model.

20 Claims, 8 Drawing Sheets

(58) Field of Classification Search
CPC .................. H04L 43/067; H04L 12/40; H04L 2012/40215; H04L 41/14; G06F 21/32; G06F 40/40; G06F 16/532; G06F 40/30; G06F 18/214; G06F 16/3344; G06F 18/27; G06F 40/289; G06F 40/295; G06F 18/217; G06F 18/22; G06F 21/6245; G06F 40/284; G06F 16/367; G06F 16/635; G06F 18/2411; G06F 18/24323; G06F 18/2433; G06F 18/25; G06F 21/562; G06F 30/27; G06F 40/12; G06F 40/177; G06F 8/30; G06F 8/33; G06F 8/34; G06F 8/53; G06F 11/3684; G06F 11/3688; G06F 16/14; G06F 16/182; G06F 16/345; G06F 16/35; G06F 16/951; G06F 16/953; G06F 16/958; G06F 16/986; G06F 18/23; G06F 18/24; G06F 30/10; G06F 40/205
See application file for complete search history.

(56) References Cited

U.S. PATENT DOCUMENTS

| | | |
|---|---|---|
| 2022/0182434 A1 | 6/2022 | Walters et al. |
| 2022/0318088 A1 | 10/2022 | Turek et al. |
| 2023/0351154 A1 | 11/2023 | Cluff et al. |
| 2024/0137375 A1* | 4/2024 | Srivatsa ................ H04L 41/142 |
| 2024/0364585 A1* | 10/2024 | Lyon ....................... H04L 41/16 |

OTHER PUBLICATIONS

Lee, Yukyung et al., "LAnoBERT: System log anomaly detection based on BERT masked language model," arXiv preprint arXiv:2111.09564 (2021).

International Search Report of the corresponding PCT/US2024/055278 mailed on Jan. 17, 2025.

Written Opinion of ISA of the corresponding PCT/US2024/055278 mailed on Jan. 17, 2025.

Petrovic N. Machine learning-based run-time DevSecOps: ChatGPT against traditional approach. In 2023 10th International Conference on Electrical, Electronic and Computing Engineering (IcETRAN) Jun. 5, 2023 (pp. 1-5). IEEE. [retrieved on Dec. 25, 2024] Retrieved from the Internet [URL: https://www.researchgate.net/profile/Nenad-Petrovic/public.:ition/371253708_Machine_Learning-Based_Run-Time_DevSecOps_ChatGPT Against_ Traditional_Approach/links/64 7 ab5 3b2cad460al bef00a4/Machine-Learning-Based-Run-TimeDevSecOps-ChatGPT-Against-Traditional-Approach.pdf].

* cited by examiner

|  Unmasked PCAP 510 | Masked PCAP 520 |
|---|---|
| NAS-PDU:<br>Non-Access-Stratum (NAS)PDU<br>   0010 .... = Security header type: Integrity protected and ciphered (2)<br>   .... 0111 = Protocol discriminator: EPS mobility management messages (0x7)<br>   Message authentication code:<br>   Sequence number: 2<br>   0000 .... = Security header type: Plain NAS message, not security protected (0)<br>   .... 0111 = Protocol discriminator: EPS mobility management messages (0x7)<br>   NAS EPS Mobility Management Message Type: Attach reject (0x44)<br>   EMM cause<br>     Cause: ESM failure (19)<br>   ESM message container<br>     Element ID: 0x78<br>     Length: 4<br>     ESM message container contents:<br>       0000 .... = EPS bearer identity: No EPS bearer identity assigned (0)<br>       .... 0010 = Protocol discriminator: EPS session management messages (0x2)<br>       Procedure transaction identity: 12<br>       NAS EPS session management messages: PDN connectivity reject (0xd1)<br>       ESM cause<br>         Cause: Network failure (38) | NAS-PDU:<br>Non-Access-Stratum (NAS)[MASK]<br>   0010 .... = Security header type: [MASK] protected and [MASK] (2)<br>   .... 0111 = [MASK] discriminator: EPS [MASK] management messages (0x7)<br>   Message [MASK] code:<br>   [MASK] [MASK]: 2<br>   0000 .... = Security header type: Plain NAS message, not security protected (0)<br>   .... 0111 = Protocol [MASK]: [MASK] mobility management messages (0x7)<br>   NAS EPS [MASK] [MASK] Message Type: Attach reject (0x44)<br>   [MASK] cause<br>     Cause: ESM [MASK] (19)<br>   [MASK] message [MASK]<br>     [MASK] ID: 0x78<br>     [MASK]: 4<br>     ESM message [MASK] contents:<br>       0000 .... = EPS bearer identity: No EPS bearer identity assigned (0)<br>       .... 0010 = [MASK] discriminator: [MASK] session management [MASK] [MASK]<br>       [MASK] transaction identity: 12<br>       NAS EPS session management [MASK]: PDN [MASK] reject (0xd1)<br>       ESM cause<br>         Cause: [MASK] [MASK] (38) |

FIG. 5

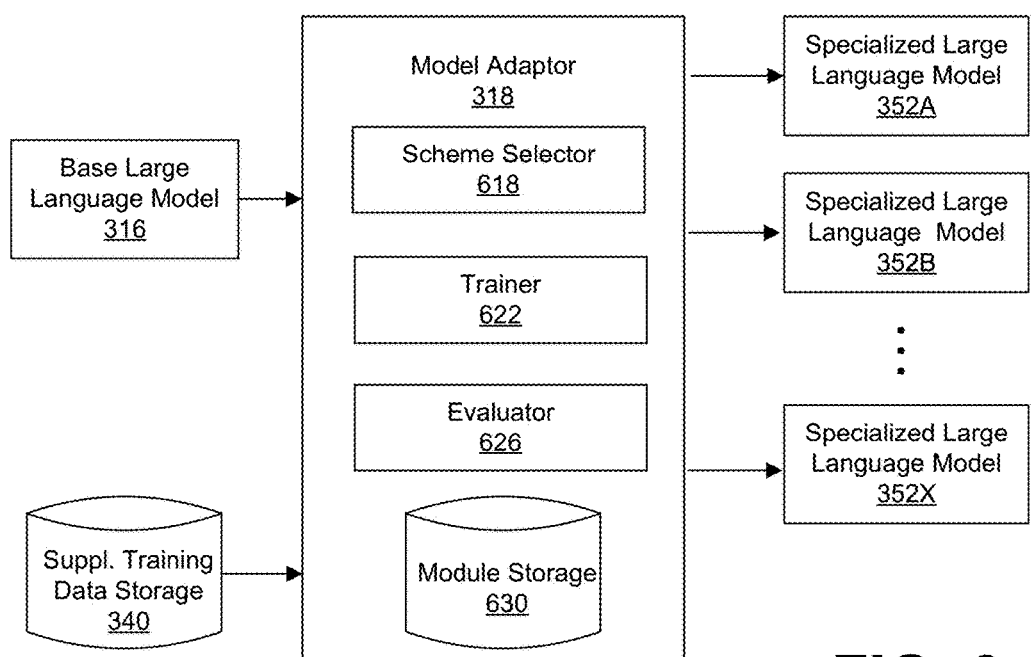

FIG. 6

EFFICIENT GENERATION OF SPECIALIZED LARGE LANGUAGE MODELS FOR NETWORK TRAFFIC ANALYSIS

BACKGROUND

This disclosure relates to performing network traffic analysis operations using specialized large language models derived from a base large language model.

A packet capture (PCAP) file is a digital data file that serves as a record of network traffic. The PCAP file is created by network sniffing tools or packet capture software, which capture and store individual network packets as they traverse a network interface or specific network segment. The PCAP files are widely used in various network-related activities such as network analysis, troubleshooting, and network security. They store the complete contents of each captured packet, including the packet header information, payload data, and any other relevant metadata. The PCAP files are formulated into a file format known as the libpcap format, which ensures compatibility and interoperability among different network analysis tools such as Wireshark, tcpdump, or Snort.

Network administrators and engineers heavily rely on PCAP files for insights into network behavior, error diagnosis, and anomaly detection. However, traditional error detection methods involving manual examination of raw data are time-consuming and error-prone, demanding skilled personnel and significant resources. Moreover, existing machine learning-based solutions often lack adaptability, relying on pre-trained models that may not accurately capture specific network nuances and error characteristics. As a result, their accuracy and efficiency in error detection may be lower than desired and often involve human intervention for adaptation.

SUMMARY

Embodiments relate to generating a specialized large language model by performing transfer learning on a base large language model trained using network traffic capture files as training data. The specialized large language model is included in an application for performing a communication network analysis. The application performs the communication network analysis on input information it receives using the specialized large language model, and generates a result of the communication network analysis.

In one or more embodiments, the network traffic capture files include packet capture (PCAP) files.

In one or more embodiments, the base large language model includes at least one neural network.

In one or more embodiments, the base large language model is trained by masked language modeling or next sentence prediction using the network traffic capture files.

In one or more embodiments, the communication network analysis is performed by removing predetermined information from the input information. The input information is fed to the specialized large language model to generate a prediction output. The generated result indicates a presence of anomaly when the accuracy of the prediction output is lower than a threshold whereas the generated result indicates an absence of the anomaly when the accuracy of the prediction output is not lower than the threshold.

In one or more embodiments, the transfer learning is performed on the base large language model by conducting further training with additional network traffic capture files and labels of the network traffic capture files. The labels indicate failure or success of call flows associated with the additional network traffic capture files. The result of the communication network analysis indicates prediction on failure or success of a call flow associated with the input information.

In one or more embodiments, the transfer learning is performed on the base large language model by further training the base large language model with labeled training data to recognized named entities. The result of the communication network analysis includes a knowledge graph associated with the recognized named entities.

In one or more embodiments, the result of the communication network analysis is call flow descriptions corresponding to network traffic capture files of the input information.

In one or more embodiments, the call flows are processed by a large language model to generate a prediction on a cause of an error for each of the call flows.

In one or more embodiments, the input information includes sets of network traffic capture files where each set of network traffic capture files is captured over a predetermined period of time, and the result of the communication network analysis is a report summarizing operating parameters of a communication network for the predetermined period of time.

Embodiments also relate to a non-transitory computer-readable storage medium storing an application for performing communication network analysis. A base large language model trained using network traffic capture files as training data and is trained to predict information in a network traffic capture file by masked language modeling. Transfer learning is performed on the base large language model to generate a specialized large language model. The application is generated by including the specialized large language model.

BRIEF DESCRIPTION OF THE DRAWINGS

Figure (FIG. 1 is a diagram of a telecommunication system for providing information services, according to one embodiment.

FIG. 5 illustrates an example masking of packet capture (PCAP) information for masked language modeling, according to one embodiment.

FIG. 6 is a block diagram of a model adaptor for generating specialized large language models from a base large language model, according to one embodiment.

Figure 1:
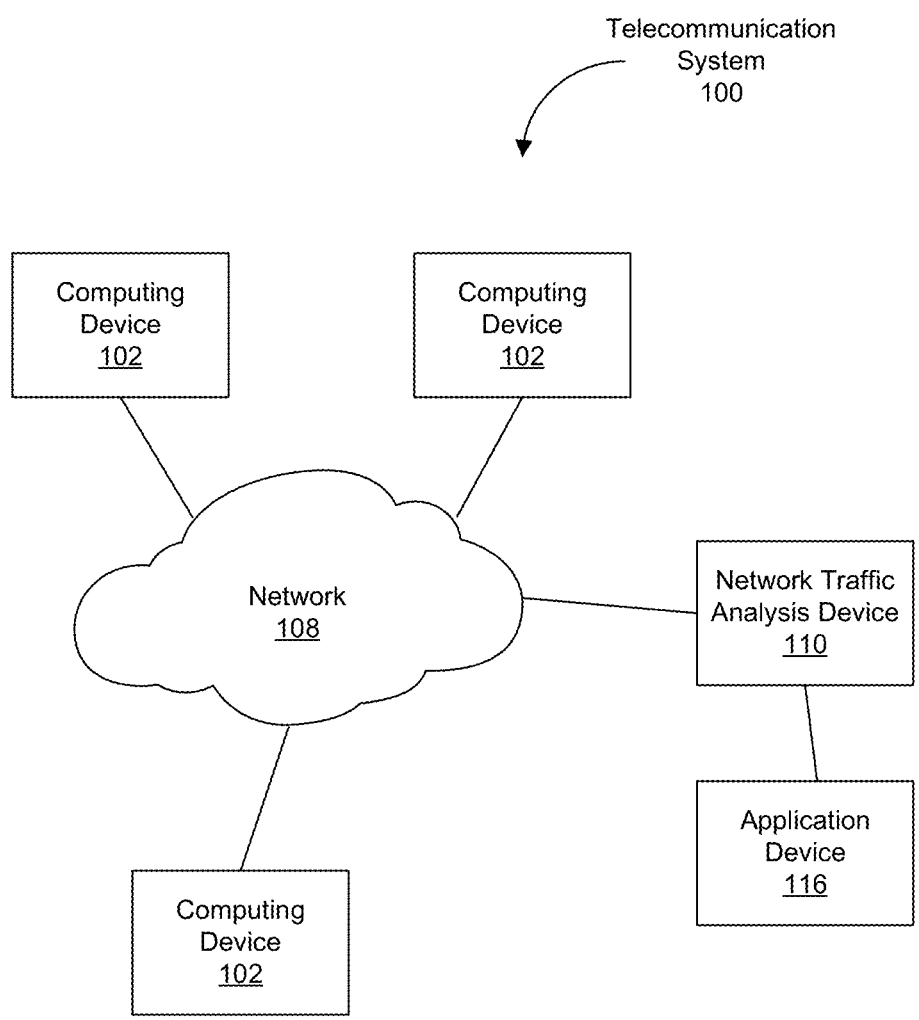

The figures depict embodiments of the present disclosure for purposes of illustration only.

DETAILED DESCRIPTION

Embodiments are described herein with reference to the accompanying drawings.

Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, reference numerals in the drawings denote elements.

Embodiments relate to generating specialized large language models by performing transfer learning on a base large language model trained using network traffic capture files. Transfer learning is performed on the base large language model to produce specialized large language models for incorporation into different applications that perform communication network analysis operations. In this way, the specialized large language models may be developed in an expedient and efficient manner by leveraging the training performed on the base large language model.

Overview of Example System

Figure (FIG. 1 is a diagram of a telecommunication system 100 for providing information services, according to one embodiment. The system 100 includes computing devices 102, a network traffic analysis device 110, and an application device 116. The computing devices 102 and the network traffic analysis device 110 are connected to each other via a network 108. In other embodiments, different and/or additional components may be included in the system 100.

Computing devices 102 are hardware, software or a combination thereof for performing computing operations that involve communication over network 108. For this purpose, a computing device may include, among other components, a processor, memory, and a network interface. The computing device may be embodied as a server, a desktop computer, a laptop computer, a cellular phone, a smartphone, a game console, a set-top box, a personal digital assistant (PDA), or IoT devices, among other things. Computing devices 102 communicate over network data or information formulated into packets.

Network traffic analysis device 110 is hardware, software or a combination thereof for monitoring and analyzing network traffic in a network. For this purpose, network traffic analysis device 110 captures network packets in network 108 and analyzes various aspects of the traffic such as source and destination of the network packets, protocols used, packet sizes, Packets Messages type, attributes and handshaking pattern, end to end services call flow, and timing information.

Application device 116 is hardware, software or a combination thereof for generating network analysis applications with specialized large language models. Application device 116 may generate one or more specialized large language models from a base large language model, and incorporates the one or more specialized large language models into the applications. Application device 116 may send the generated applications to network traffic analysis device 110 for deployment. Although application device 116 is illustrated in FIG. 1 as being a device separate from network traffic analysis device 110, both application device 116 and network traffic analysis device 110 may be embodied on a single device.

Network 108 is a collection of network devices that communicate and route network packets from a source computing device to one or more destination computing devices, and may embodied as, among others, Local Area Networks (LANs), Wide Area Networks (WANs), Wireless Local Area Networks (WLANs), Metropolitan Area Networks (MANs), Campus Area Networks (CANs), Storage Area Networks (SANs), Virtual Private Networks (VPNs), Intranets, Extranets, the Internet, Peer-to-Peer Networks, Mobile Networks and a combination thereof. These networks may be implemented using one or more communication technologies such as Ethernet, Universal Serial Bus (USB), Wi-Fi, Bluetooth, Zigbee, Z-Wave, Global System for Mobile Communications (GSM), Code Division Multiple Access (CDMA), Long-Term Evolution (LTE), Second Generation (2G), Third Generation (3G), Fourth Generation (4G), Fifth Generation (5G), and Sixth Generation (6G).

Architecture of Traffic Analysis Device/Application Device

Figure 2:
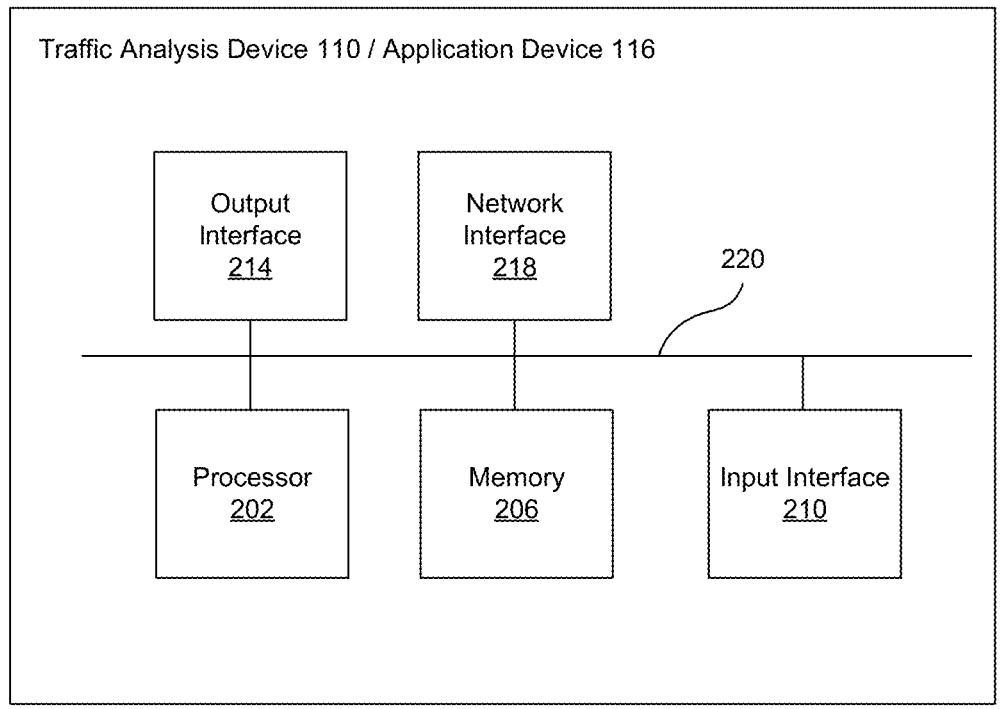
FIG. 2 is a block diagram of a traffic analysis device and/or an application device, according to one embodiment.

FIG. 2 is a block diagram of network traffic analysis device 110 and/or application device 116, according to one embodiment. The network traffic analysis device 110 and/or application device 116 may include, among other components, a processor 202, a memory 206, an input interface 210, an output interface 214, a network interface 218, and a bus 220 connecting these components. Network traffic analysis device 110 and/or application device 116 may include components such as power supply, not illustrated in FIG. 2.

Processor 202 retrieves and executes commands stored in memory 206. Processor 202 may be embodied as a central processing unit (CPU), a graphics processing unit (GPU) or application-specific integrated circuits (ASICs). Although only a single processor 202 is illustrated in FIG. 2, multiple processors may be provided in network traffic analysis device 110 and/or application device 116.

Memory 206 stores the applications for execution and/or stores software components for training the base large language model and deriving the specialized large language models from the base large language model. Memory 206 may be embodied using various technologies or their combinations, including, for example, Random Access Memory (RAM), Read-Only Memory (ROM), flash memory, Hard Disk Drive (HDD), Solid-State Drive (SSD), virtual memory, magnetic tape and optical discs. Various software components stored in memory 206 are described below in detail with reference to FIG. 3 through FIG. 6.

Input interface 210 is hardware or hardware in combination with software that receives data from external sources. The external source may include user interface devices such as a pointing device and keyboard.

Output interface 214 is hardware or hardware in combination with software that provides the result of computation in various forms (e.g., image or audio signals). Output interface 214 may include, for example, a display device. The result of analyzing the network packets and/or prediction results obtained using the applications may be formulated into tables, graphs or texts, and presented to a human operator for further actions. Output interface 214 may also provide graphical user interface (GUI) for receiving user inputs on operations associated with the operation of network traffic analysis device 110 and/or application device 116.

Network interface 218 enables network traffic analysis device 110 to receive network packets for analysis and/or communicate with computing devices via network 108. Network interface 218 may be embodied as network interface card (NIC) or a network adaptor, and implements various network protocols and standards. Network interface 218, when provided on application device 116, it may enable application device 116 to receive training data for generating the specialized large language models from sources such as network traffic analysis device 110.

Figure 3:
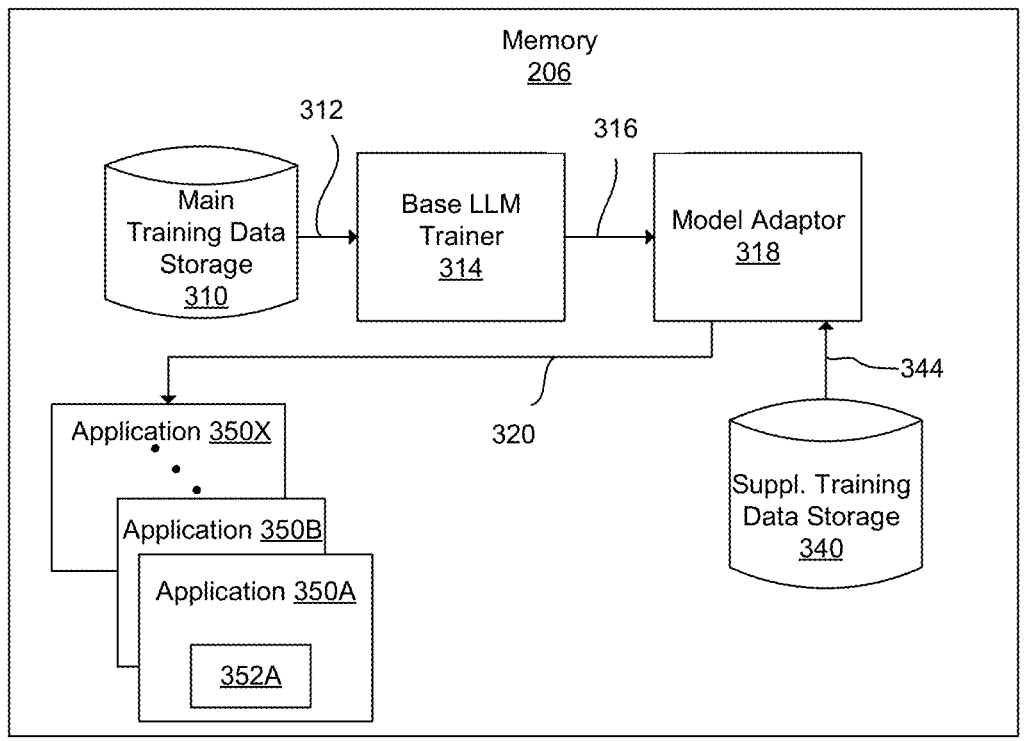
FIG. 3 is a block diagram of software components in memory of an application device, according to one embodiment.

FIG. 3 is a block diagram of software components in memory 206 of application device 116, according to one embodiment. Memory 206 may store, among other software components, a main training data storage 310, a base large language model trainer 314, a model adaptor 318, a supplemental training data storage 340, and applications 350A through 350X (hereinafter collectively referred to as "applications 350" or individually as "application 350"). Main training data storage 310 is coupled to base large language model trainer 314 to send training data 312 to base large language model trainer 314. After base large language model trainer 314 generates a base large language model 316 using training data 312, it is sent to model adaptor 318. Model adaptor 318 may use supplemental training data 344 stored in supplemental training data storage 340 and/or additional software components to generate specialized large language models 320, and sends them for incorporation into applications 350. Memory 206 may include components not illustrated in FIG. 3 such as an operating system.

Main training data storage 310 stores training data 312 for training base large language model 316. The training data may include, for example, network traffic capture files such as PCAP files, network traces (e.g., Jaeger traces) and network logs. These network traffic capture files include detailed information on the network traffic and communication sufficient to diagnose and troubleshoot a network, but due to the large amount of information in the network traffic capture files, the network traffic capture files are generally analyzed using various network traffic analysis tools. Applications 350 incorporating specialized large language models 320 perform at least some functions of these network traffic analysis tools. Although the embodiments are described primarily with reference to PCAP files for convenience, the same embodiments may be applied to other types of network traffic capture files.

Training data may be real network capture files generated from actual network traffic (e.g., by network traffic analysis device 110) or network capture files generated artificially using various techniques (e.g., using packet generation model 1106 described below with reference to FIG. 11). In one or more embodiments, training data 312 includes only PCAP files that are associated with successful call flows but not any PCAP files that resulted in failed call flows. In this way, the base large language may be trained by base large language model trainer 314 to predict patterns of PCAP files in a successful call flow.

Base large language model trainer 314 performs training of base large language model 316 using training data 312. The training may be performed in a non-supervised manner. In one or more embodiments, base large language model trainer 314 uses masked language modeling to train base large language model 316 to predict masked information in training data 312. During training of base large language model 316, part of data in unmasked PCAP file 510 is masked to generate masked PCAP file 520, as shown in FIG. 5. The masked PCAP file 520 is then used in base large language model 316 as training data. The corresponding data in unmasked PCAP file 510 is used as ground truth data by base large language model 316 to compare its prediction and update its parameters to increase its prediction accuracy. In masked PCAP file 510, "[MASK]" indicates information that is masked for training base large language model 316. To enhance the efficiency and accuracy of the training, information not useful for training the base large language model 316, such as source and destination IP addresses that change dynamically in a call flow, may be removed from PCAP files for training.

Model adaptor 318 performs transfer learning on base large language model 316 to generate specialized large language models 320. For this purpose, supplemental training data 344 may be provided to model adaptor 318. In one or more embodiments, the amount of supplemental training data 344 is smaller than that of training data 312 used for training base large language model 316. By performing transfer learning, faster convergence of training with less training time may be achieved despite the smaller sized supplemental training data.

Various types of transfer learning techniques may be used by model adaptor 318 to generate specialized large language models 320. Transfer learning is a machine learning technique that leverages training from one task and applies it to a different, but related, task. These techniques include, among others, LoRA, QLoRA, fine-tuning, domain adaptation, pre-trained embedding, model stacking, self-supervised learning, progressive large languages, continual learning, zero-shot, and few-shot learning. Model adaptor 318 includes information on the transfer learning techniques that may be suited for certain specialized large language models, and executes these techniques using supplemental training data 344 and/or other software modules. Model adaptor 318 may automatically apply transfer learning techniques to the base large language model or operate based on instructions from a human user to apply a certain transfer learning technique to the base large language model. Details of model adaptor 318 are described below in detail with reference to FIG. 6.

Supplemental training data storage 340 stores supplemental training data 344 that is suitable for performing the transfer learning techniques to base large language model 316. Depending on the specialized large language models 320 being generated, different types of supplemental training data 344 may be used. For example, when generating a specialized large language model for a failure detection, supplemental training data 344 may include PCAP files labeled with indication of success or failure of the associated call flows.

Each of applications 350 performs a certain network analysis operation using specialized large language model 352A through 352X received from model adaptor 318. These applications 350 may include other functional modules in addition to the specialized large language models. Examples of the applications are described below in detail with reference to FIGS. 8 through 12. After applications 350 are generated by application device 116, these applications 350 may be deployed in one or more network traffic analysis devices 110 to perform network analysis operations on real network traffic. Alternatively, applications 350 may perform network analysis operations on network traffic capture files stored from previous communication sessions. Further, multiple applications 350 may operate in conjunction to better diagnose a network or troubleshoot errors in the network.

Example Base Large Language Model

Figure 4:
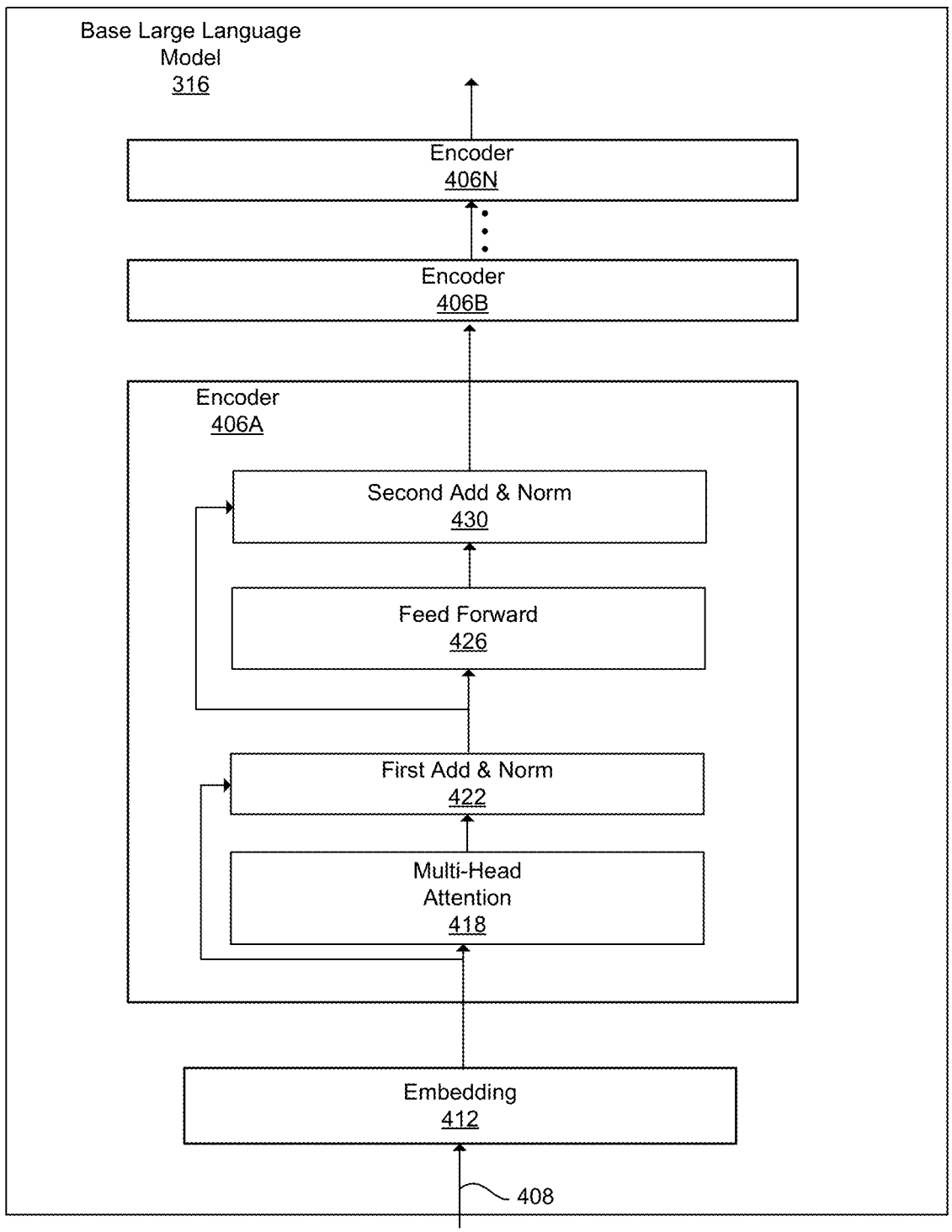
FIG. 4 is a block diagram of a base large language model, according to one embodiment.

FIG. 4 is a block diagram of base large language model 316, according to one embodiment. Base large language model 316 may be embodied using a bidirectional encoder representation from transformers (BERT) architecture. BERT architecture includes, among other components, an embedding module and a stack of encoders 406A through 406N (hereinafter collectively referred to as "encoders 406" or individually as "encoder 406") where an output from one encoder (e.g., 406A) is fed as an input to the next encoder (e.g., 406B).

Embedding module 412 receives input 408 (e.g., PCAP file) and converts it into a set of contextual embeddings (also referred to herein as "input embeddings"). For this purpose, embedding module 412 splits input 408 into tokens while adding specialized tokens. One of such specialized tokens is a mask token used during masked language modeling, as described above with reference to FIG. 5. Positional embeddings indicating the positions of each of the tokens may also be added. The token embeddings, the positional embeddings and other embeddings are concatenated into the contextual embeddings, and provided as an output of embedding module 412.

Each of the encoders 406 includes, among other components, a multi-head attention module 418, a first add and normalize module 422, a feed forward module 426, and a second add and normalize module 430. Multi-head attention module 418 uses multiple sets, or attention heads where each of the attention heads processes different aspects of context. For each token in input 408, attention scores for all other tokens are independently calculated by these attention heads. The computed attention weights from these different attention heads are then combined to create a comprehensive contextual representation for each token. Multi-head attention module 418 may be embodied using a neural network.

Feed forward module 426 combines the output of first multi-head attention module 418 with the input embeddings, and layer normalization is applied to standardizes the activations within the layer. First feed forward module 426 may be embodied as a neural network. First feed forward module 426 may include two linear transformations followed by a nonlinear activation function (e.g., ReLU).

The output of the feed forward module 426 is then provided to second add and normalize module 430. Second add and normalize module 430 adds the output of feed forward module 426 to the original input embeddings. Then the layer normalization is applied to standardize the activations within each layer. The output from the add and normalize module 430 is then fed to the next encoder.

The process of feeding the output from a previous encoder as an input to the subsequent encoder is repeated until the last encoder is reached. The output from the last encoder is then provided as the output of the base large language model 316. When the masked language modeling is performed on the base large language model 316, its output is the predicted probability distribution over each masked token in the input.

Although BERT was used as base large language model 316 in the example of FIG. 4, various other architectures may be used to embody base large language model 316. Base large language model 316 may be embodied, for example, using transformer-based architecture such as, ALBERT, BART, BERT, BigBird, CamemBERT, ConvBERT, Data2VecText, DeBERTa, DeBERTa-v2, DistilBERT, ELECTRA, ERNIE, ESM, FlauBERT, FNet, Funnel Transformer, I-BERT, LayoutLM, Longformer, LUKE, mBART, MEGA, Megatron-BERT, MobileBERT, MPNet, MRA, MVP, Nezha, Nyströmformer, Perceiver, QDQBert, Reformer, RemBERT, ROBERTa, ROBERTa-PreLayerNorm, RoCBert, RoFormer, SqueezeBERT, TAPAS, Wav2Vec2, XLM, XLM-ROBERTa, XLM-ROBERTa-XL, X-MOD, and YOSO or may use other types of architecture such as mixture-of-experts. Base large language model 316 may also include multiple large language models that are cascaded.

Example Architecture of Model Adaptor

FIG. 6 is a block diagram of model adaptor model adaptor 318, according to one embodiment. Model adaptor 318 is a software component that performs transfer learning on base large language model 316 using supplemental training data and/or by applying modules (e.g., adaptors) to the base large language model 316. Transfer learning schemes, supplemental training data and/or additional modules employed for generating the specialized large language models may differ depending on the applications in which the specialized large language models are incorporated. Model adaptor 318 may include, among other components, scheme selector 618, trainer 622, an evaluator 626, and module storage 630. Model adaptor 318 may include other components not illustrated in FIG. 6 such as an optimizer that enhances the performance of corresponding specialized large language model 352 using various techniques.

Scheme selector 618 is a module for selecting a transfer learning scheme to be applied to base large language model 316 to generate a specialized large language model. Scheme selector 618 may store logic for automatically or semi-automatically selecting a transfer learning scheme for the specialized large language model. To select an appropriate scheme for transfer learning, selector 618 may consider the size of the base large language model, availability of supplemental training data, the underlying task complexity, system and time constraints, and determined training strategy. Alternatively, scheme selector 618 may receive a user input to select a transfer learning scheme. The transfer learning schemes for selection may include, among other schemes, fine-tuning, adaptors, LoRA, QLoRA, pre-trained embedding, model stacking, self-supervised learning, progressive large language modeling, continual learning, zero-shot and few-shot learning. Hyperparameters associated with the selected transfer learning scheme may also be selected by or via scheme selector 618.

After a transfer learning scheme is decided, model adaptor 318 may modify base large language model 316 by adding adaptors or other modules, and/or locking weights of certain layers in a neural network included in base large language model 316. Other modules that may be added to the base large language model 316 may include, among others, modules for preprocessing or postprocessing, regularization, normalization, extra weight matrices and/or kernels, specific activation functions. The modified version of base large language model 316 may then be sent to trainer 622 as a specialized large language model.

Trainer 622 may perform additional training on the specialized large language model using supplemental training data from supplemental training data storage 340. Supplemental training data may be customized for training a corresponding specialized large language model 352. In one or more embodiments, trainer 622 may select or filter supplemental training data available from other sources (e.g., main training data storage 310 or PCAP files generated in real-time by network traffic analysis device 110) for more efficient training.

The supplemental training data in supplemental training data storage 340 may be network traffic capture files (e.g., PCAP files) or data other than the network traffic capture files. For example, the supplemental training data may include data on call flows with labels indicating their success or failure, data on call flows with labels indicating their specific protocol, error code and description, instructions for packet or call flow generation, and other log data.

Evaluator 626 is a component that assesses the performance of an intermediate version or final version of the specialized large language model generated as a result of the transfer learning scheme selected by scheme selector 618. For example, evaluator 626 may compare the prediction/inference result of the current specialized large language model with the actual data (e.g., ground truth) to determine the accuracy of the specialized large language model. Evaluator 626 may also determine the computational time or resources for performing prediction/inference by the current large language model. If the current large language model satisfies the performance requirement, then the current large language model is set as the specialized large language model for deployment. Conversely, if the current large language model does not satisfy the performance requirement, evaluator 626 may prompt a user or model adaptor 318 to modify the transfer learning scheme and/or its hyperparameters. The process may be performed iteratively until a satisfactory specialized large language model is obtained.

Module storage 630 stores modules for use in modifying base large language model 316 into specialized large language models 352. The modules may include, among others, adaptors, preprocessing modules, postprocessing modules, and various types of layers such as convolutional, pooling, recurrent, transformer, linear, normalization, loss functions, and nonlinear activations.

Example Processes of Generating Specialized Large Language Model

Figure 7:
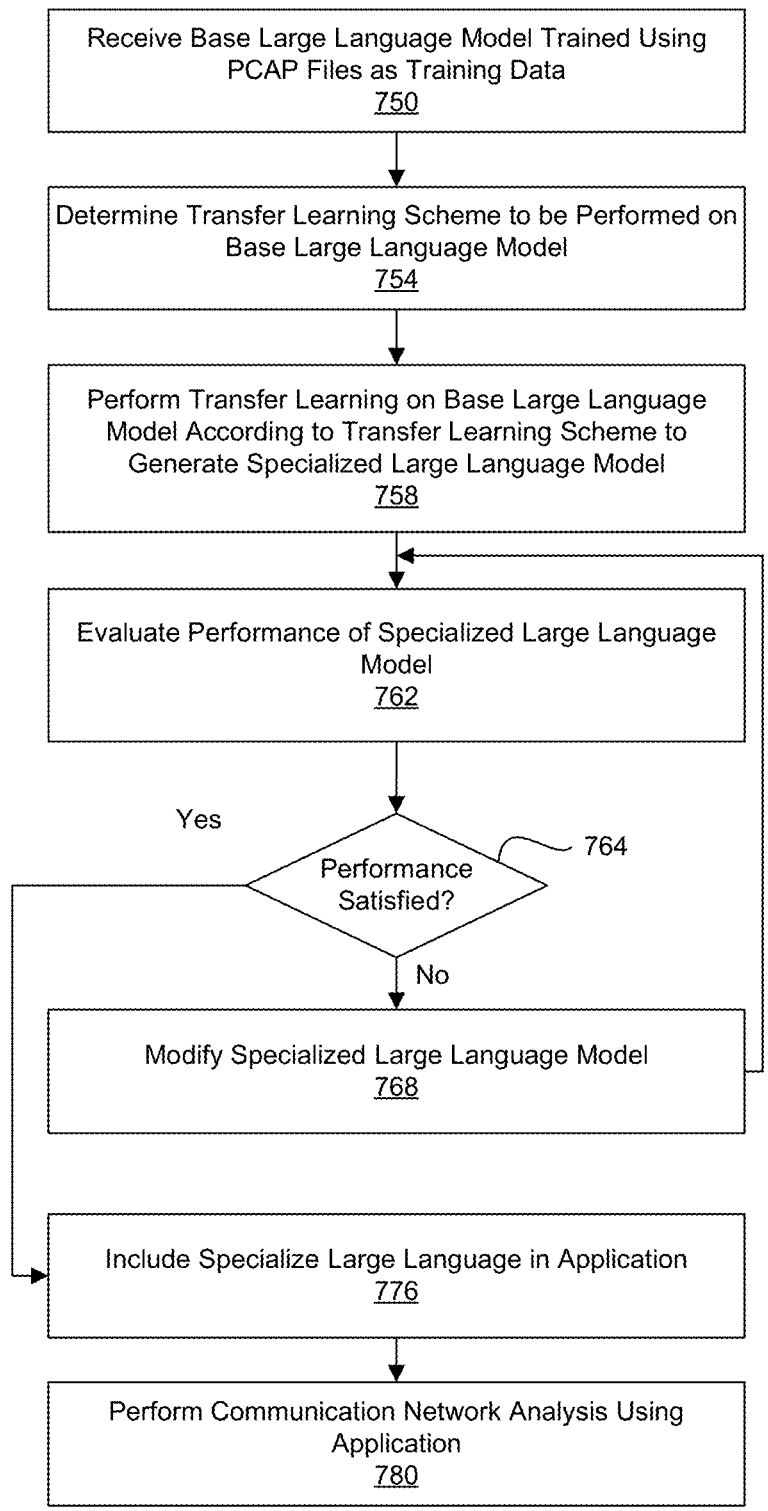
FIG. 7 is a flowchart illustrating a process for generating an application from a base large language model, according to one embodiment.

FIG. 7 is a flowchart illustrating a process for generating an application from a base large language model, according to one embodiment. First, a base large language model is received 750 at model adaptor 318. The base large language model is trained using PCAP files or other network traffic capture files as its training data. In one or more embodiments, the PCAP files used for training the base large language model do not include any errors and are associated with successful call flows. Further, certain fields of the PCAP files not beneficial to expedited training (e.g., source and destination IP addresses) are removed from the PCAP files used as training data for the base large language model.

A transfer learning scheme to be applied to the base large language model is then selected 754. The transfer learning scheme may include, among others, adaptors, LoRA, QLoRA, fine-tuning, domain adaptation, pre-trained embedding, model stacking, self-supervised learning, progressive and continual learning, zero-shot, and few-shot learning. The selection may also include setting of any parameters or hyperparameters associated with the transfer learning scheme.

Then, transfer learning is performed 758 on the base large language model scheme to generate a specialized large language model. If applicable, adaptors or other software modules are added to the base large language model to generate the specialized large language model. Supplemental training may be performed on the specialized large language model using the supplemental training data.

The performance of the specialized large language model is then evaluated 762. It is determined 764 whether the performance requirement of the specialized large language model is satisfied or not. If not, the specialized large language model is modified 768 and the process returns to evaluating 762 its performance. The modification may include adjusting parameters or hyperparameters of the specialized large language model, training the specialized large language model using additional or alternative training data, replacing/removing/adding adaptors, and modifying the topology of the model.

If it is determined 764 that the specialized large language model satisfies the performance requirement, then the specialized large language model is included 776 in an application. The application including the specialized large language model may be deployed in network traffic analysis device 110 to perform 780 communication network analysis.

The processes described above with reference to FIG. 7 are merely illustrative. Additional processes may be added, or some processes may be performed in parallel. For example, the evaluating 762 performance of the specialized large language model may be performed as part of the training process while the transfer learning is being performed 758.

Example Use of Specialized Large Language Model

The specialized large language models may be included in various applications for deployment to perform communication network analysis. Examples of applications include, but are not limited to anomaly detection, communication failure detection, knowledge graph generation, root error prediction, network packet generation, and continuous network reporting, as described below in detail with reference to FIGS. 8 through 12. Other applications may also take advantage of the specialized large language models or further applications may be built on top of the applications described below.

Figure 8:
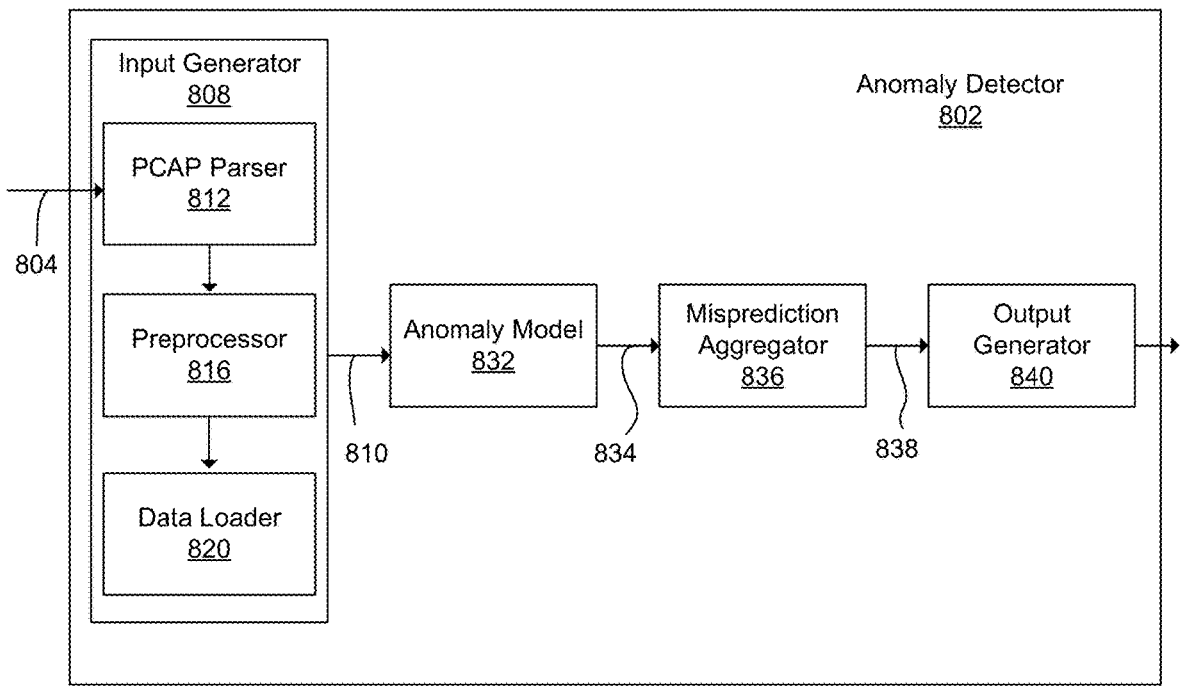
FIG. 8 is a block diagram of an anomaly detector including an anomaly model, according to one embodiment.

FIG. 8 is a block diagram of anomaly detector 802, according to one embodiment. Anomaly detector 802 receives PCAP files 804 and predicts the likelihood that there is an anomaly in network 108 or call flows. For this purpose, anomaly detector 802 may include, among other components, an input generator 808, an anomaly model 832, a misprediction aggregator 836 and an output generator 840. Anomaly detector 802 may include other components not illustrated in FIG. 8.

Input generator 808 receives raw PCAP files 804 and generates processed a sequence 810 of text derived from PCAP files 803 for sending to anomaly model 832. Input generator 808 may include, among other components, a PCAP parser 812, a preprocessor 816, and a data loader 820. PCAP parser 812 extracts data from PCAP files in libpcap format, converts the extracted data into a format appropriate for subsequent processing (e.g., text file), and sends the extracted data to preprocessor 816. Preprocessor 816 removes information from extracted data that may hinder accurate prediction or is deemed to unnecessarily increase the processing time of the anomaly detection operation. For example, preprocessor 816 may remove source and destination IP addresses included in raw PCAP file 804 since the IP addresses change frequently and are generally not predictable. Information such as private and sensitive user details, unnecessary information, empty fields and attributes may also be removed from the extracted data. Data loader 820 receives data processed by preprocessor 816 and loads it as a sequence 810 of text onto anomaly model 832.

Anomaly model 832 is a specialized large language model that masks part of data in the sequence 810 of text and predicts the masked data. The part of data (e.g., token) to be masked may be determined randomly or be predetermined. Anomaly model 832 is trained to predict masked data and generates probability distribution of the predicted data. Anomaly model 832 generates prediction on the masked data and its probability distribution as its output 834, and sends output 834 to misprediction aggregator 836.

Misprediction aggregator 836 receives output 834 from anomaly model 832 and compares it with the correct information. Specifically, misprediction aggregator 836 determines whether the prediction of the masked data coincides with the actual data before the masking to determine if the prediction made by anomaly model 832 is accurate. Misprediction aggregator 836 aggregates mispredictions made by its output 834 to generate misprediction score 838 representing the number of mispredictions or the ratio of incorrect predictions relative to entire predictions. In one or more embodiments, misprediction aggregator 836 may reflect the characteristics of probability distribution in the output 834 to generate the misprediction score 838. For example, uniform distribution of the probabilities of predicted values in output 834 would indicate low confidence of the prediction, and hence, the misprediction score 838 would be increased in the case of misprediction. In other embodiments, the misprediction score 838 is determined by counting the number of mispredictions and then normalizing the number of predictions by the lengths of the PCAP file.

Output generator 840 receives misprediction score 838 and determines whether an anomaly is likely present in the network or call flows. For example, output generator 840 may determine that an anomaly is present when the accuracy of the prediction (as indicated by misprediction score 838) is below a threshold while determining that an anomaly is not present when the accuracy of the prediction is not below the threshold. In addition or alternatively, output generator 840 may determine that there is an anomaly when there is a sudden spike in misprediction score 838. Output generator 840 may also take into account typical patterns of mispredictions (e.g., periodical changes in network configuration) when determining the presence of anomaly. When it is determined that an anomaly is likely to be present, output generator 840 may generate an output 842 indicating the presence of anomaly.

In one or more embodiments, output generator 840 identifies times or geographic locations associated with the mispredictions. Further, output generator 840 may indicate keywords in the PCAP files that are prone to mispredictions. Such information may be used in assessing the severity of issues in the network and/or selecting remedial actions on the network.

Figure 9:
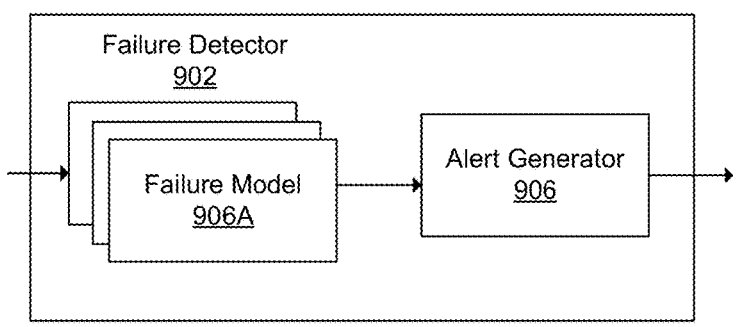
FIG. 9 is a block diagram of a failure detector including one or more failure models, according to one embodiment.

FIG. 9 is a block diagram of failure detector 902, according to one embodiment. Failure detector 902 receives raw PCAP files 910 and determines if they include any errors. Failure detector 902 may include one or more failure models 906 which are specialized large language models customized to detect certain errors in raw PCAP files 910. Once an error is detected by the one or more failure models 906, a notification is sent to alert generator 908. The alert generator 908 then sends an alert notification to a user to troubleshoot any issues in a network in a timely manner.

In one or more embodiments, each of the failure models 906 are derived from the base large language model through fine-tuning. Each of the failure models 906 may be provided with supplemental training data with labels indicating whether the PCAP files includes errors or not. Different failure models may be trained using certain types of errors in the PCAP files for efficient and accurate training. In some embodiments, each of the failure models may be trained to detect errors at different granular levels. Alternatively, a single failure model may be derived from the base large language model to detect different types of errors in the PCAP files.

In other embodiments, a transfer learning scheme other than fine-tuning may be used. For example, adaptors, LoRA, QLoRA, domain adaptation, pre-trained embedding, model stacking, self-supervised learning, progressive and continual learning, zero-shot, and few-shot learning may be used to generate one or more failure models from the base large language model.

Figure 10A:
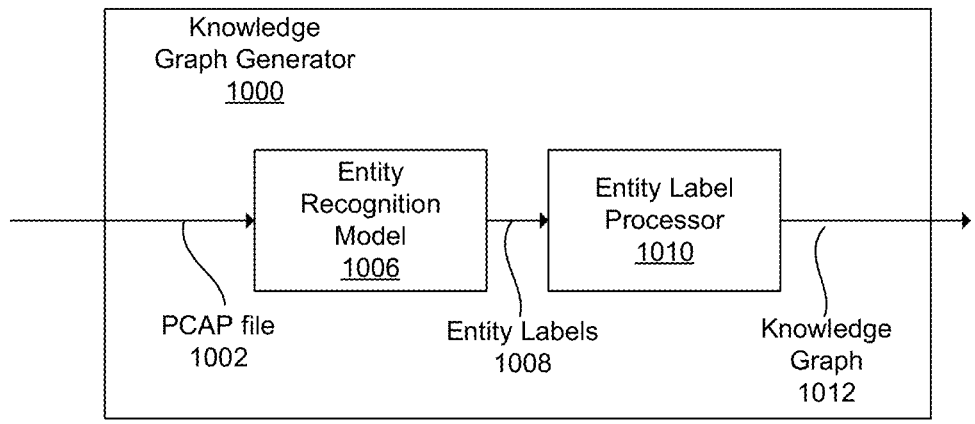
FIG. 10A is a block diagram of a knowledge graph generator, according to one embodiment.

FIG. 10A is a block diagram of a knowledge graph generator 1000, according to one embodiment. Knowledge graph generator 1000 generates a knowledge graph 1012 on network communication entities and their relationships based on PCAP files 1002. For this purpose, knowledge graph generator 1000 includes, among other components, entity recognition model 1006 and entity label processor 1010.

A knowledge graph described herein refers to is a structured representation about elements (e.g., packet sender, packet target, network package type, network communication protocol, error code, error description, and network elements) in the PCAP files and their relationships. The elements in the PCAP files as entities and their relationships are organized into a graph format, where nodes represent the elements (e.g., entities) and edges represent the connections or relationships between those elements. By using the knowledge graph, a user may advantageously perceive the state of a communication network and perform troubleshooting operation to resolve any issues in the communication network.

Entity recognition model 1006 is a specialized large language model derived from a base large language model to detect specific sets of keywords in PCAP files 1002. Entity recognition model 1006 may be generated from the base large language model by using an ontology and labeled training data. The entity recognition model may be obtained by utilizing the aforementioned techniques of transfer learning and/or training model from scratch. The training involves teaching the model to understand key entities and extract them from the input text. The labels indicate certain groups of entities within the sequence of input tokens. After deployment, entity recognition model 1006 detects keywords in PCAP files 1002 and generate corresponding entity labels 1008 indicative of entities as defined in the ontology used during training of the entity recognition model 1006.

Entity label processor 1010 receives the entity labels 1008 from entity recognition model 1006 and generates knowledge graph 1012 indicating key entities in the PCAP files 1002 and their relationship. The knowledge graph can be constructed based on the extracted entities from the input PCAP files as well as their attention scores (extracted from the large language model), and their co-occurrence in the sequence of tokens. If both entities appear frequently within the same context window and their attention weights are large, their relation will be stronger in the knowledge graph. Such structure can be constructed on different granular levels (e.g., for each PCAP, or collection of PCAPs).

Figure 10B:
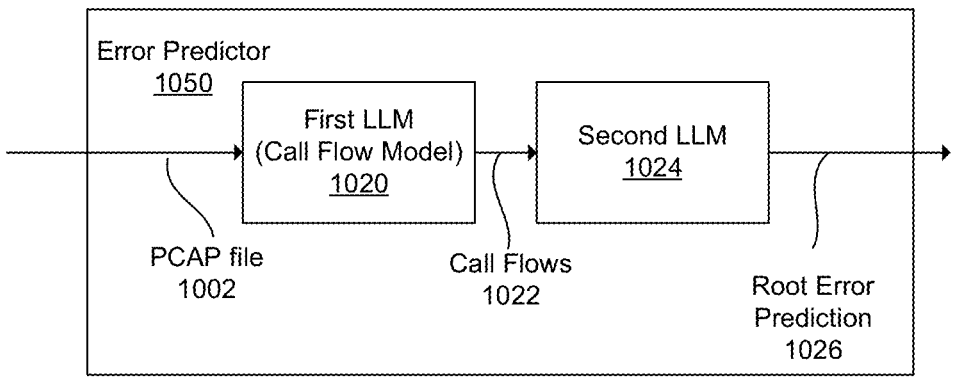
FIG. 10B is a block diagram of an error predictor including a call flow model, according to one embodiment.

FIG. 10B is a block diagram of error predictor 1050, according to one embodiment. Error predictor 1050 receives PCAP files 1002 and predicts any root cause of errors in call flows from PCAP files 1002. For this purpose, error predictor 1050 includes large language models 1020, 1024 that are cascaded. First large language model 1020 is a call flow model that generates call flow descriptions 1022. Second large language model 1024 receives the generated call flow descriptions 1022 and produces prediction 1026 on root error for each call flow.

A call flow described herein refers to a sequence of exchange of network packets between two or more entities in a telecommunication network. The call flow may be used to provide services using the telecommunication network. For example, in a Voice over IP (VOIP) call, the call flow would include protocols like Session Initiation Protocol (SIP) for call setup, Real-time Transport Protocol (RTP) for audio streaming, and various signaling and control protocols for managing the call session. A call flow description describes information on a corresponding call flow in a predetermined format (e.g., text format).

First large language model 1020 is a specialized large language model that is derived from a base large language model. In one or more embodiments, first large language model 1020 is obtained using fine-tuning of the base large language model in a supervised manner. Supervised training involves presenting to the large language model, labels in the form of classes of different call flow errors. Each error category can be a combination of protocol, code, and description attributes. Based on such fine-tuning and supervised learning, first large language model 1020 generates call flow descriptions 1022 from PCAP files 1002. Each of the call flow description 1022 may be in the form of a text file.

Second large language model 1024 is distinct from first large language model 1020 and is adapted for natural language processing. Second large language model 1024 is trained to predict root error for a call flow from its call flow description provided by first large language model 1020. In one or more embodiments, second large language model 1024 is obtained by performing transfer learning on a large language model that is adapted for natural language processing since a call flow description is expressed in a text format close to natural language. The large language model for natural language processing is different and distinct from the base large language model trained using the PCAP files.

Figure 11:
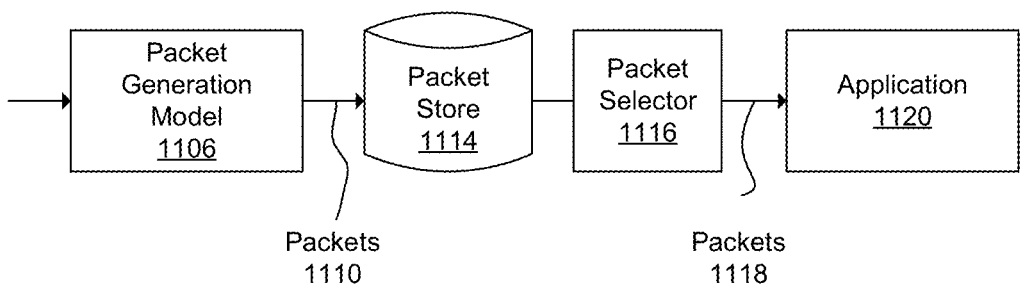
FIG. 11 is a conceptual diagram of generating network packets by a model and using them, according to one embodiment.

FIG. 11 is a conceptual diagram of using network packets 1114 generated by packet generation model 1106, according to one embodiment. To generate network packets 1114, prompt 1112 may be provided by a user or an automatic system. Prompt 1112 may instruct the packet generation model 1106 to generate certain types of packets (e.g., "generate 8 packets with at least one packet with 404 Not Found Error"). Generated packets 1114 may be stored in packet store 1118 and then selectively retrieved by packet selector 1122 and sent to application 1126 for various purposes (e.g., training of a model). Such artificial generation of network packets are useful, for example, when missing packets are indicated in a PCAP file.

Packet generation model 1106 may be derived from a base large language model by utilizing its reconstruction capabilities and unmask partially hidden parts of the PCAP data. Although the base large language model is trained using masked language modeling procedure, various transfer learning techniques in a next sentence prediction scenario may be employed. A single and/or multiple tokes are masked from the input sequence with high probability. Subsequently, the specialized large language model reconstructs the input with visible alterations, when compared to the original input data. Such augmentation allows to generate almost infinite sequences of similar PCAPs.

Figure 12:
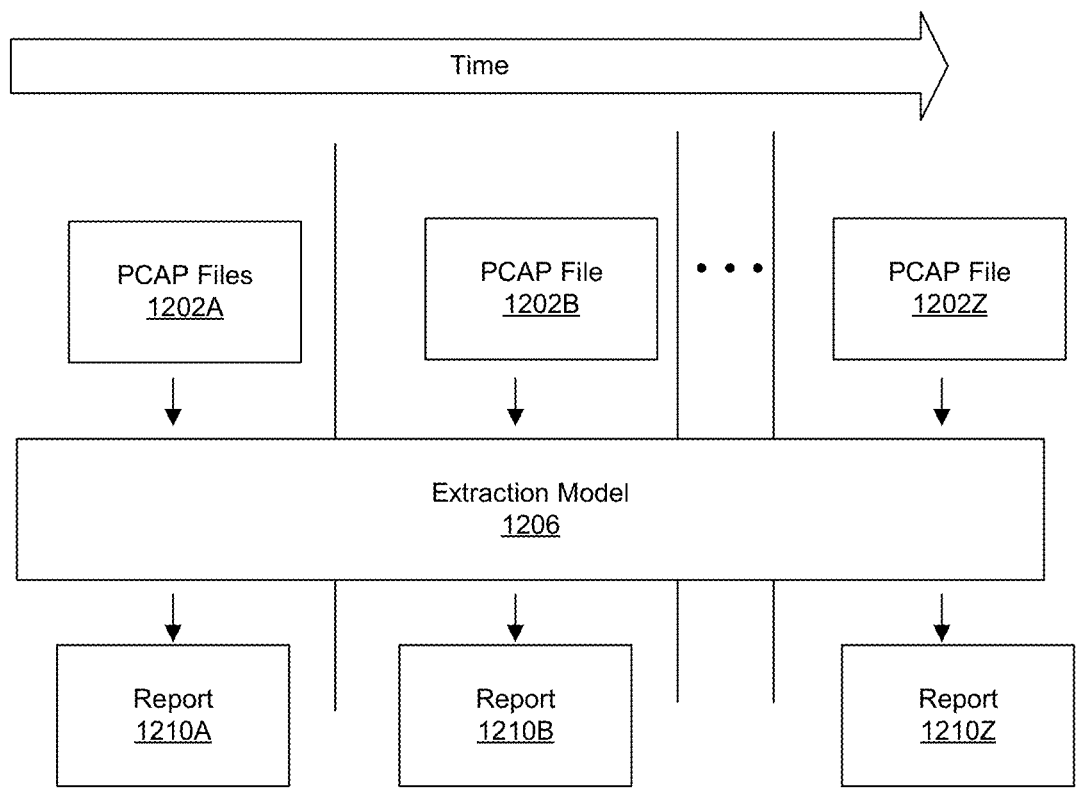
FIG. 12 is a conceptual diagram illustrating generation of a series of reports based on sets of PCAP files, according to one embodiment.

FIG. 12 is a conceptual diagram illustrating generation of a series of reports 1210A through 1210Z (hereinafter collectively referred to as "reports 1210") based on sets of PCAP files 1201A through 1202Z received over time, according to one embodiment. For this purpose, extraction model 1206 may be used. The reports may include, among others, various network operation parameters such as information communication parameters and quality control indicators, and summary of PCAP files received over a time frame. The information to be included in the report may be customized.

Extraction model 1206 is a specialized large language model derived from the base large language model to analyze a set of PCAP files and generate a report summarizing the set of PCAP files. Extraction model 1206 may be generated by employing the question answering technique and transfer learning, where an input PCAP (context) is combined with a prompt/question. The last input in the form of labels is the sequence of answer tokens, which should be generated by the specialized large language model. Although only a single extraction model 1206 is illustrated in FIG. 12, multiple extraction models, each trained as a separate specialized large language model may be used to provide information for different data to be included in the reports 1210.

In one or more embodiments, the PCAP files are collected over a predetermined amount of time and then forwarded to extraction model 1206 to generate a corresponding report. The PCAP files may then be collected over a next time frame and then be forwarded to extraction model 1206 to generate another report for the next time frame. The PCAP files over periods of time may be collected and forwarded to extraction model 1206 so that periodic reports may be generated by extraction model 1206.

Alternative Embodiments

Although above embodiments are described primarily with reference to using a single specialized large language model for a network analysis operation, multiple specialized large language models may be used in tandem or in a cascaded manner to perform a more thorough or high-level network traffic analysis operation. The results or prediction from each of the specialized large language model may be collected to make better diagnosis of the network issues and take more appropriate remedial actions.

Further, the above-described applications (e.g., anomaly detector, failure detector, knowledge graph generator, error predictor, packet generator and report generator) are described above as being embodied as applications stored in memory, these applications may be embodied using dedicated hardware devices. That is, a dedicated and specialized hardware device may perform the operations of these applications.

Upon reading this disclosure, those of skill in the art will appreciate still additional alternative ways of generating specialized large language models. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method comprising:
receiving a base large language model trained using network traffic capture files as training data, the base large language model trained to predict information in a network traffic capture file;
performing transfer learning on the base large language model to generate a specialized large language model by at least further training the base large language model with additional network traffic capture files and labels of the additional network traffic capture files indicating failure or success of call flows associated with the additional network traffic capture files; and including the specialized large language model in an application for performing a communication network analysis on subsequent network traffic capture files received by the application and for generating a result of the communication network analysis performed by the application.

2. The method of claim 1, wherein the network traffic capture files comprise packet capture (PCAP) files.

3. The method of claim 1, wherein the base large language model comprises at least one neural network.

4. The method of claim 3, wherein the base large language model is trained by masked language modeling or next sentence prediction using the network traffic capture files.

5. The method of claim 3, wherein performing the communication network analysis comprises:

removing predetermined fields from the subsequent network traffic capture files to generate revised network traffic capture files;

feeding the revised network traffic capture files to the specialized large language model to generate a prediction output; and determining whether accuracy of the prediction output, the generated result indicating a presence of anomaly responsive to the accuracy of the prediction output being lower than a threshold, the generated result indicating an absence of the anomaly responsive to the accuracy of the prediction output not being lower than the threshold.

6. The method of claim 1, wherein the result of the communication network analysis indicates prediction on failure or success of a call flow associated with the subsequent network traffic capture files.

7. The method of claim 1, wherein performing the transfer learning on the base large language model comprises further training the base large language model with labeled training data to named entities, and wherein the result of the communication network analysis comprises a knowledge graph associated with the named entities.

8. The method of claim 1, wherein the result of the communication network analysis is call flow descriptions corresponding to the subsequent network traffic capture files.

9. The method of claim 8, further comprising processing the call flows by a large language model to generate a prediction on cause of an error for each of call flows corresponding to the call flow descriptions.

10. The method of claim 1, wherein each set of the subsequent network traffic capture files captured over a predetermined period of time, and the result of the communication network analysis is reports summarizing operating parameters of a communication network for predetermined periods of time.

11. The method of claim 1, wherein the network traffic capture files used in training the base large language model are associated with successful call flows but not unsuccessful call flows.

12. A method of generating applications for communication network analysis, comprising:

training a base large language model by feeding network traffic capture files to the base large language models as training data;

performing transfer learning on the base large language model to generate a plurality of specialized large language models by at least further training the base large language model with additional network traffic capture files and labels of the additional network traffic capture files indicating failure or success of call flows associated with the additional network traffic capture files;

generating the applications for performing communication network analysis by including one of the specialized large language models in a corresponding one of the applications; and deploying the generated application for performing the communication network analysis.

13. The method of claim 12, wherein the base large language model is a bidirectional encoder representation from transformers (BERT).

14. The method of claim 12, wherein the base large language model is trained using masked language modeling or next sentence prediction.

15. The method of claim 12, wherein the network traffic capture files used in training the base large language model are associated with successful call flows but not unsuccessful call flows.

16. A computing device comprising:

one or more processors; and memory storing instructions thereon, the instructions when executed by the one or more processors cause the one or more processors to:

receive a base large language model trained using network traffic capture files as training data, the base large language model trained to predict information in a network traffic capture file, perform transfer learning on the base large language model to generate a specialized large language model by at least further training the base large language model with additional network traffic capture files and labels of the additional network traffic capture files indicating failure or success of call flows associated with the additional network traffic capture files, and include the specialized large language model in an application for performing communication network analysis for performing the communication network analysis on input information received by the application and for generating a result of the communication network analysis performed by the application.

17. The computing device of claim 16, wherein the network traffic capture files comprise packet capture (PCAP) files.

18. The computing device of claim 16, wherein the base large language model is trained by masked language modeling or next sentence prediction using the network traffic capture files.

19. The apparatus of claim 16, wherein the network traffic capture files used in training the base large language model are associated with successful call flows but not unsuccessful call flows.

20. A non-transitory computer-readable storage medium storing an application for performing communication network analysis, the application generated by:

receiving a base large language model trained using network traffic capture files as training data, the base large language model trained to predict information in a network traffic capture file by masked language modeling or next sentence prediction;

performing transfer learning on the base large language model to generate a specialized large language model by at least further training the base large language model with additional network traffic capture files and labels of the additional network traffic capture files indicating failure or success of call flows associated with the additional network traffic capture files; and including the specialized large language model in the application.

\* \* \* \* \*